United States Patent
Hosotani et al.

(10) Patent No.: US 12,531,486 B2
(45) Date of Patent: Jan. 20, 2026

(54) SCALABLE POWER SUPPLY SYSTEM

(71) Applicant: Murata Manufacturing Co., Ltd., Kyoto-fu (JP)

(72) Inventors: Tatsuya Hosotani, Nagaokakyo (JP); Yoshihiro Fujiwara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 206 days.

(21) Appl. No.: 18/583,563

(22) Filed: Feb. 21, 2024

(65) Prior Publication Data
US 2024/0195282 A1 Jun. 13, 2024

Related U.S. Application Data

(63) Continuation of application No. PCT/JP2022/030208, filed on Aug. 8, 2022.

(30) Foreign Application Priority Data

Aug. 23, 2021 (JP) .................. 2021-135279

(51) Int. Cl.
*H02M 3/158* (2006.01)
*H02M 1/00* (2006.01)
(Continued)

(52) U.S. Cl.
CPC ....... *H02M 3/1584* (2013.01); *H02M 1/0048* (2021.05); *H02M 3/155* (2013.01); *H02M 3/158* (2013.01); *H02M 1/088* (2013.01)

(58) Field of Classification Search
CPC .. H02M 3/1584; H02M 1/0048; H02M 3/155; H02M 3/158; H02M 1/088
See application file for complete search history.

(56) References Cited

U.S. PATENT DOCUMENTS 6,246,222 B1 * 6/2001 Nilles ................. H02M 3/1584
                                                              323/283
6,574,124 B2 * 6/2003 Lin .................... H02M 3/33569
                                                                363/72
(Continued)

FOREIGN PATENT DOCUMENTS

JP S50-152650 A 12/1975
JP S55-071319 A 5/1980
(Continued)

OTHER PUBLICATIONS

International Search Report issued in PCT/JP2022/030208; mailed Oct. 11, 2022.

*Primary Examiner* — Yusef A Ahmed
(74) *Attorney, Agent, or Firm* — Studebaker Brackett PLLC

(57) ABSTRACT

A power supply system includes an MPU, multiple power conversion circuits, and multiple extended-control circuits. The MPU supplies a digital switching driving signal to the power conversion circuit, and supplies a digital switching driving signal to the power conversion circuit. The extended-control circuit, which includes a CR circuit, generates a switching driving signal which is delayed with respect to the digital switching driving signal, and supplies the switching driving signal to the power conversion circuit. The extended-control circuit, which includes a CR circuit, generates a switching driving signal which is delayed with respect to the digital switching driving signal, and supplies the switching driving signal to the power conversion circuit.

9 Claims, 10 Drawing Sheets

(51) Int. Cl.
*H02M 3/155* (2006.01)
*H02M 1/088* (2006.01)

(56) References Cited

U.S. PATENT DOCUMENTS

| | | | |
|---|---|---|---|
| 10,381,918 B1* | 8/2019 | Stoichita | H02M 1/15 |
| 11,469,661 B2* | 10/2022 | King | H02J 7/0063 |
| 11,545,903 B1* | 1/2023 | Li | H02M 3/33523 |
| 2004/0169499 A1* | 9/2004 | Huang | H02M 3/1584 |
| | | | 323/272 |
| 2004/0201552 A1* | 10/2004 | Onozawa | G09G 3/293 |
| | | | 345/60 |
| 2008/0129259 A1* | 6/2008 | Endo | H02M 3/1584 |
| | | | 323/272 |
| 2009/0152949 A1* | 6/2009 | Adragna | H02J 1/102 |
| | | | 307/31 |
| 2010/0013306 A1* | 1/2010 | Heineman | H02J 1/001 |
| | | | 307/32 |
| 2012/0086416 A1* | 4/2012 | Kudo | G06F 1/26 |
| | | | 323/265 |
| 2013/0051095 A1* | 2/2013 | Iwata | H02M 1/4225 |
| | | | 363/81 |
| 2015/0115910 A1* | 4/2015 | Jiang | H02M 3/1584 |
| | | | 323/271 |
| 2021/0305908 A1* | 9/2021 | Kodera | H02M 7/062 |
| 2021/0408913 A1* | 12/2021 | Yanagida | H02M 1/0025 |
| 2021/0408914 A1* | 12/2021 | Hosotani | H02M 3/1586 |
| 2021/0408916 A1* | 12/2021 | Sakamoto | H02M 1/0025 |
| 2022/0131467 A1* | 4/2022 | Hosotani | H02M 3/1586 |
| 2023/0010809 A1* | 1/2023 | Sakamoto | H02M 1/0067 |
| 2023/0016857 A1* | 1/2023 | Hosotani | H02M 1/0009 |
| 2023/0299679 A1* | 9/2023 | Li | H02M 1/4258 |
| 2023/0361681 A1* | 11/2023 | Cheng | H02M 3/1584 |
| 2023/0361683 A1* | 11/2023 | Hosotani | H02M 1/0025 |
| 2024/0088791 A1* | 3/2024 | Hosotani | H02M 3/1584 |
| 2024/0322710 A1* | 9/2024 | Tan | H02M 3/1586 |
| 2025/0175072 A1* | 5/2025 | Shi | H02M 1/08 |

FOREIGN PATENT DOCUMENTS

| | | |
|---|---|---|
| JP | H02-192371 A | 7/1990 |
| JP | 2004-309983 A | 11/2004 |
| JP | 2010-119177 A | 5/2010 |
| JP | 2012-080744 A | 4/2012 |
| JP | 2013-094058 A | 5/2013 |
| JP | 2014-087185 A | 5/2014 |
| JP | 2015-146711 A | 8/2015 |
| JP | 2015-168292 A | 9/2015 |
| JP | 2017-158373 A | 9/2017 |
| JP | 2019-176606 A | 10/2019 |

* cited by examiner

SCALABLE POWER SUPPLY SYSTEM

CROSS-REFERENCE TO RELATED APPLICATIONS

This application claims benefit of priority to International Patent Application No. PCT/JP2022/030208, filed Aug. 8, 2022, and to Japanese Patent Application No. 2021-135279, filed Aug. 23, 2021, the entire contents of each are incorporated herein by reference.

BACKGROUND

Technical Field

The present disclosure relates to a power supply system including multiple power conversion circuits, and particularly to a scalable power supply system.

Background Art

Japanese Unexamined Patent Application Publication No. 2019-176606 describes a switching power supply device. The switching power supply device described in Japanese Unexamined Patent Application Publication No. 2019-176606 includes multiple pulse compensators. The pulse compensators generate individual pulse signals for driving multiple power conversion circuits. The pulse compensators cause the phases of the individual pulse signals to be different from each other, achieving a multiphase operation.

Japanese Unexamined Patent Application Publication No. 2015-146711 describes a multiphase DC-DC converter. The multiphase DC-DC converter described in Japanese Unexamined Patent Application Publication No. 2015-146711 includes multiple delay circuits. The delay circuits delay a PWM driving signal which is output by a control circuit. The control circuit and the delay circuits supply the PWM driving signal and the delay-controlled PWM driving signals to converter driving units which are connected downstream of the control circuit and the delay circuits, correspondingly. Thus, multiphase driving is achieved.

Japanese Unexamined Patent Application Publication No. 2014-87185 describes a DC-DC converter. The DC-DC converter described in Japanese Unexamined Patent Application Publication No. 2014-87185 includes a phase controller. The phase controller detects the state of the DC-DC converter, and dynamically changes the number of phases to be driven. The phase controller provides, to a distributor, the number of phases to be driven. The distributor distributes, to driver ICs, multiple pulse signals to which a phase difference is set in accordance with the number of phases to be driven and which are obtained from a single pulse signal. Thus, multiphase driving is achieved.

Japanese Unexamined Patent Application Publication No. 2013-94058 describes a semiconductor device for power supply. The semiconductor device for power supply described in Japanese Unexamined Patent Application Publication No. 2013-94058 includes multiple driving ICs with timers. The driving ICs with timers are connected to each other in a ring shape, and transmit trigger signals sequentially. On the basis of the trigger signals, the driving ICs with timers exert switching control, while the time is delayed sequentially. Thus, multiphase driving is achieved.

Japanese Unexamined Patent Application Publication No. 2010-119177 describes a multiphase DC-DC converter. The multiphase DC-DC converter described in Japanese Unexamined Patent Application Publication No. 2010-119177 includes a phase controller and a pulse distributor. The phase controller sets the number of phases to be driven, and the number of phases is provided to the pulse distributor. In accordance with the number of phases to be driven, the pulse distributor distributes multiple pulses, which are included in a single driving signal, to multiple driving signals so that the pulses do not overlap each other. Thus, multiphase driving is achieved.

SUMMARY

However, the devices described in Japanese Unexamined Patent Application Publication No. 2019-176606, Japanese Unexamined Patent Application Publication No. 2015-146711, Japanese Unexamined Patent Application Publication No. 2014-87185, Japanese Unexamined Patent Application Publication No. 2013-94058 and Japanese Unexamined Patent Application Publication No. 2010-119177 have complicated configurations for generating multiple pulse signals (PWM driving signals) in accordance with the number of phases, necessitating design of special custom ICs for the respective devices.

In the related art, an interleaved distribution circuit has been proposed. The signal frequency decreases in accordance with the number of distributions of the signal. Thus, there arises a problem in that the transient response degrades and use of such a distribution circuit is not allowed depending on the control range at the operating frequency of the converter. This problem may be solved if the frequency of the input signal is increased in accordance with the number of distributions. However, in many cases, depending on the upper limit of the operating frequency of a control circuit formed of semiconductor, the problem fails to be addressed.

Therefore, the present disclosure provides a scalable power supply system which achieves multiphase driving in accordance with the number of power conversion circuits, which are to be driven, with a simple configuration, with suppression of reduction of the power conversion efficiency, and without being limited by the number of driving outputs of a control IC.

A scalable power supply system of this disclosure includes multiple power conversion circuits, a power management control circuit, and an extended-control circuit. The power conversion circuits each include an inductor and a power semiconductor circuit including a switching device and a driving unit. The switching device controls current flowing through the inductor. The driving unit drives the switching device. The power management control circuit generates a first digital switching driving signal that is to be provided to a first power semiconductor circuit of the power semiconductor circuits.

The extended-control circuit is electrically connected between the power management control circuit and a second power semiconductor circuit, which is different from the first power semiconductor circuit, of the power semiconductor circuits. The extended-control circuit generates a second switching driving signal from the first digital switching driving signal to provide the second switching driving signal to the second power semiconductor circuit. The extended-control circuit has a voltage-time conversion circuit that sets a predetermined signal delay time with respect to the first digital switching driving signal and that generates the second switching driving signal.

The voltage-time conversion circuit has a threshold-signal conversion circuit that uses a time constant of a CR circuit, which is constituted by a resistance and a capacitor, and a threshold voltage to determine the signal delay time.

The extended-control circuit uses the time constant of the CR circuit of the threshold-signal conversion circuit to set the phase of a second analog switching driving signal on which the second switching driving signal is based. The extended-control circuit uses the threshold voltage of the threshold-signal conversion circuit and the second analog switching signal, whose phase has been set, to set the on-time width of the second switching driving signal so that the on-time width of the second switching driving signal is equal to the on-time width of the first digital switching driving signal. The extended-control circuit determines a count of the power conversion circuits in accordance with the total number of signals which is obtained by adding the first signal count of the first digital switching driving signal and the second signal count of the second switching driving signal together.

In this configuration, the second switching driving signal is generated from the first digital switching driving signal which is output from a single power management control circuit. The second switching driving signal has a phase different from that of the first digital switching driving signal and has an on-time width equal to that of the first digital switching driving signal. Multiphase driving is achieved by providing the first digital switching driving signal and the second switching driving signal to the respective individual power conversion circuits.

The second switching driving signal is delayed with respect to the first digital switching driving signal. Thus, even when the number of power conversion circuits is increased, the switching frequency is not reduced, and is maintained.

Further, the extended-control circuit, which generates the second switching driving signal, is a CR circuit of a resistor and a capacitor, achieving a simple configuration.

This disclosure may provide a scalable power supply system which achieves multiphase driving which may extend the scale of the output power capacitance. The scale of the output power capacitance may be extended in the following manners: with a simple configuration in which a control IC is connected to an extension circuit; with small power consumption in the extension circuit and suppression of reduction of the power conversion efficiency; by flexibly responding to an increase of current without being limited by the number of driving outputs of the control IC and in accordance with the number of power conversion circuits which are to be driven.

DETAILED DESCRIPTION

A scale-extendable power supply system in the subject application means a power supply system in which the number of power conversion circuits, which are used in multiphase driving, is allowed to be set to a desired number. For example, the scale-extendable power supply system means a power supply system which, in order to achieve a desired value of output current at a desired value of output voltage with high efficiency, may be configured by setting appropriately the number of power conversion circuits necessary as a system. Hereinafter, a scale-extendable power supply system is simply referred to as a power supply system.

First Embodiment

Figure 1:
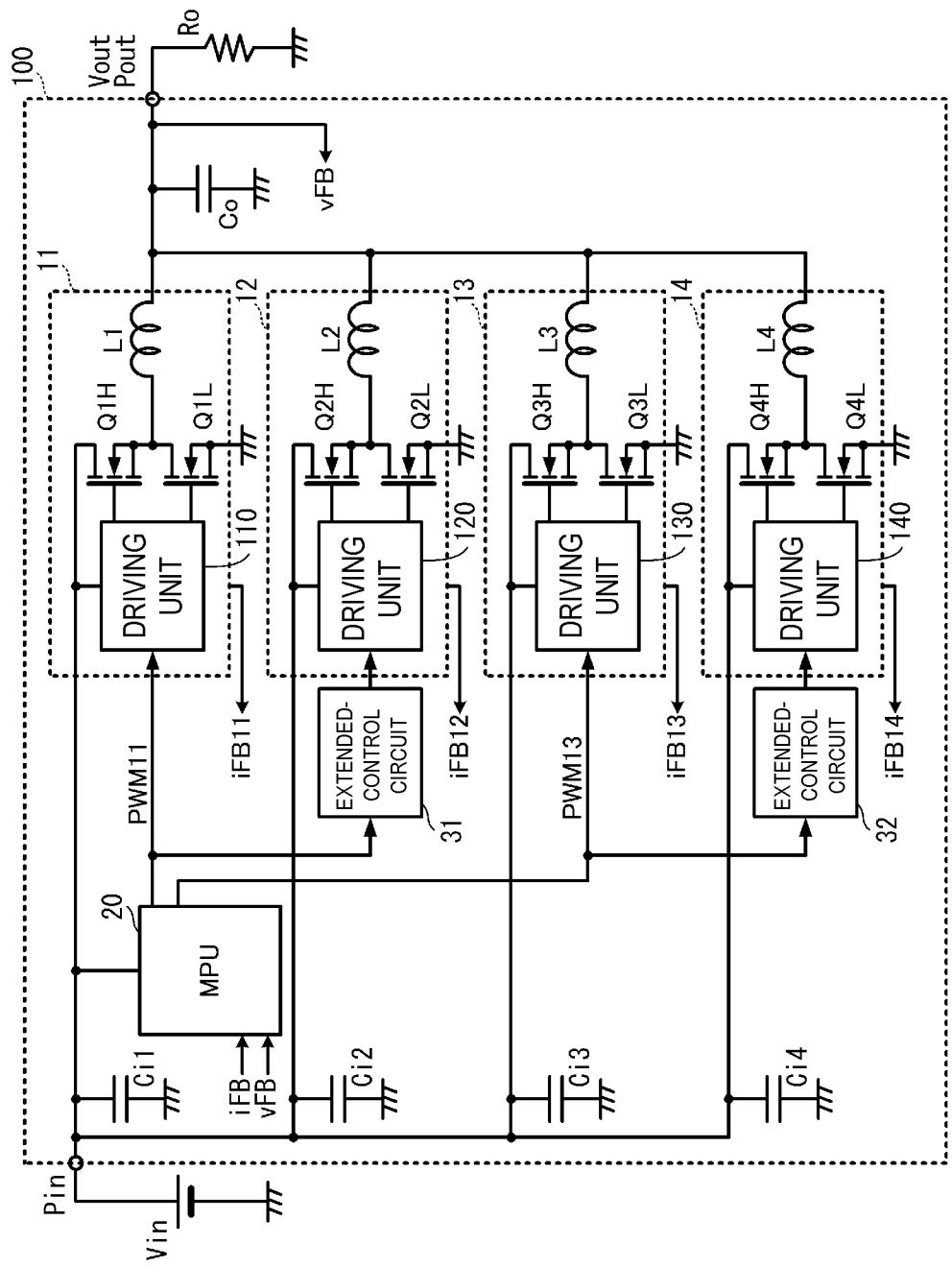
FIG. 1 is a circuit block diagram illustrating an exemplary power supply system according to a first embodiment.

A power supply system according to a first embodiment of the present disclosure will be described by referring to figures. FIG. 1 is a circuit block diagram illustrating an exemplary power supply system according to the first embodiment.

As illustrated in FIG. 1, a power supply system 100 includes multiple power conversion circuits 11 to 14 (a power conversion circuit 11, a power conversion circuit 12, a power conversion circuit 13, and a power conversion circuit 14), an MPU 20, and multiple extended-control circuits 31 to 32 (an extended-control circuit 31 and an extended-control circuit 32). In the present embodiment, the number of power conversion circuits is four. However, the configuration according to the present embodiment is applicable if the number of power conversion circuits is greater than or equal to two. The number of extended-control circuits is two, but may be set in accordance with the number of power conversion circuits and the number of digital switching driving signals which may be output from the MPU 20 making their phases different from each other.

The Schematic Configuration of the Power Supply System 100

The power supply system 100 includes a common input terminal Pin and a common output terminal Pout. The common input terminal Pin is connected to an external direct voltage source (input power supply). The power supply system 100 receives supply of a direct-current input voltage Vin from the common input terminal Pin. The common output terminal Pout is connected to a load Ro. The voltage at the common output terminal Pout serves as an output voltage Vout of the power supply system 100.

The MPU 20, which is connected to the common input terminal Pin, is supplied with power through the common input terminal Pin. Actually, the MPU 20 is connected, at its power supply input end, for example, to a regulator, and is supplied with power through the regulator. The power supply line is connected to the ground reference potential through an input capacitor Ci1.

The MPU 20, which is a programmable Micro Processing Unit, is implemented, for example, by using an IC which implements a multiphase controller. The MPU 20 corresponds to a "power management control circuit" of the present disclosure.

The MPU 20 is connected to the power conversion circuit 11 and the power conversion circuit 13.

The extended-control circuit 31 is connected, at its input end, to the connection line between the MPU 20 and the power conversion circuit 11, and is connected, at its output end, to the power conversion circuit 12. The extended-control circuit 32 is connected, at its input end, to the connection line between the MPU 20 and the power conversion circuit 13, and is connected, at its output end, to the power conversion circuit 14.

The power conversion circuits 11 to 14, which are connected to the common input terminal Pin, are supplied with power through the common input terminal Pin. The power supply line of the power conversion circuit 11 is connected to the ground reference potential through the input capacitor Ci1. The power supply line of the power conversion circuit 12 is connected to the ground reference potential through an input capacitor Ci2. The power supply line of the power conversion circuit 13 is connected to the ground reference potential through an input capacitor Ci3. The power supply line of the power conversion circuit 14 is connected to the ground reference potential through an input capacitor Ci4.

The output end of the power conversion circuit 11, the output end of the power conversion circuit 12, the output end of the power conversion circuit 13, and the output end of the power conversion circuit 14 are connected to each other at the common output node, and are connected to the common output terminal Pout through the common output node.

The power conversion circuits 11 to 14 individually and separately perform, in parallel, power conversion operations for converting the input voltage Vin to the output voltage Vout. The power conversion circuits 11 to 14 have the same circuit configuration.

As illustrated in FIG. 1, the power conversion circuit 11 includes a driving unit 110, a switching device Q1H, a switching device Q1L, and an inductor L1. The driving unit 110, the switching device Q1H, and the switching device Q1L are formed, for example, in an integrated FET built-in PWM control IC (analog circuit IC). A circuit unit, which are constituted by the driving unit 110, the switching device Q1H, and the switching device Q1L, corresponds to a "power semiconductor circuit" of the disclosure of the subject application.

The driving unit 110, which is connected to the common input terminal Pin, is supplied with power through the common input terminal Pin. The driving unit 110 is connected to the MPU 20. The gate of the switching device Q1H and the gate of the switching device Q1L are connected to the driving unit 110.

The drain of the switching device Q1H is connected to the common input terminal Pin. The source of the switching device Q1H and the drain of the switching device Q1L are connected to each other. The source of the switching device Q1L is connected to the ground reference potential. The inductor L1 is connected, at its first end, to the node between the switching device Q1H and the switching device Q1L, and is connected, at its second end, to the common output node.

The power conversion circuit 12 includes a driving unit 120, a switching device Q2H, switching device Q2L, and an inductor L2. The driving unit 120, the switching device Q2H, and the switching device Q2L are formed, for example, in an integrated FET built-in PWM control IC (analog circuit IC). A circuit unit, which is constituted by the driving unit 120, the switching device Q2H, and the switching device Q2L, corresponds to a "power semiconductor circuit" of the disclosure of the subject application.

The driving unit 120, which is connected to the common input terminal Pin, is supplied with power through the common input terminal Pin. The driving unit 120 is connected to the extended-control circuit 31. The gate of the switching device Q2H and the gate of the switching device Q2L are connected to the driving unit 120.

The drain of the switching device Q2H is connected to the common input terminal Pin. The source of the switching device Q2H and the drain of the switching device Q2L are connected to each other. The source of the switching device Q2L is connected to the ground reference potential. The inductor L2 is connected, at its first end, to the node between the switching device Q2H and the switching device Q2L, and is connected, at its second end, to the common output node.

The power conversion circuit 13 includes a driving unit 130, a switching device Q3H, a switching device Q3L, and an inductor L3. The driving unit 130, the switching device Q3H, and the switching device Q3L are formed, for example, in an integrated FET built-in PWM control IC (analog circuit IC). A circuit unit, which is constituted by the driving unit 130, the switching device Q3H, and the switching device Q3L, corresponds to a "power semiconductor circuit" of the disclosure of the subject application.

The driving unit 130, which is connected to the common input terminal Pin, is supplied with power through the common input terminal Pin. The driving unit 130 is connected to the MPU 20 through a line different from that of the driving unit 110. The gate of the switching device Q3H and the gate of the switching device Q3L are connected to the driving unit 130.

The drain of the switching device Q3H is connected to the common input terminal Pin. The source of the switching device Q3H and the drain of the switching device Q3L are connected to each other. The source of the switching device Q3L is connected to the ground reference potential. The inductor L3 is connected, at its first end, to the node between the switching device Q3H and the switching device Q3L, and is connected, at its second end, to the common output node.

The power conversion circuit 14 includes a driving unit 140, a switching device Q4H, a switching device Q4L, and an inductor L4. The driving unit 140, the switching device Q4H, and the switching device Q4L are formed, for example, in an integrated FET built-in PWM control IC (analog circuit IC). A circuit unit, which is constituted by the driving unit 140, the switching device Q4H, and the switching device Q4L, corresponds to a "power semiconductor circuit" of the disclosure of the subject application.

The driving unit 140, which is connected to the common input terminal Pin, is supplied with power through the common input terminal Pin. The driving unit 140 is connected to the extended-control circuit 32. The gate of the switching device Q4H and the gate of the switching device Q4L are connected to the driving unit 140.

The drain of the switching device Q4H is connected to the common input terminal Pin. The source of the switching device Q4H and the drain of the switching device Q4L are connected to each other. The source of the switching device Q4L is connected to the ground reference potential. The inductor L4 is connected, at its first end, to the node between the switching device Q4H and the switching device Q4L, and is connected, at its second end, to the common output node.

The common output terminal Pout is connected to the ground reference potential through to an output capacitor Co.

The output voltage Vout at the common output terminal Pout is fed back to the MPU 20 through a voltage feedback circuit vFB. At that time, the voltage feedback circuit vFB converts the output voltage Vout to a voltage, which is capable of being received by the MPU 20, for feedback to the MPU 20. However, the detailed circuit is not illustrated.

Power conversion circuits 11 detect the inductor current of the inductors L1, and feed back the detected inductor-current value of the inductors L1 to the MPU 20 through an individual-current feedback circuit iFB11. However, the detailed circuit is not illustrated. Power conversion circuits 12 detect the inductor current of the inductors L2, and feed back the detected inductor-current value of the inductors L2 to the MPU 20 through an individual-current feedback circuit iFB12. Power conversion circuits 13 detect the inductor current of the inductors L3, and feed back the detected inductor-current value of the inductors L3 to the MPU 20 through an individual-current feedback circuit iFB13. Power conversion circuits 14 detect the inductor current of the inductors L4, and feed back the detected inductor-current value of the inductors L4 to the MPU 20 through an individual-current feedback circuit iFB14.

Specific Description about Multiphase Driving

The MPU 20 generates a digital switching driving signal PWM11 for the power conversion circuit 11 and a digital switching driving signal PWM13 for the power conversion circuit 13. The digital switching driving signal PWM11 and the digital switching driving signal PWM13 are rectangular-wave signals. The digital switching driving signal PWM11 and the digital switching driving signal PWM13 have the same frequency, and have a predetermined phase difference (do not have the same phase). In this case, the number of power conversion circuits, to which the MPU 20 outputs switching driving signals, is two. Thus, the phase difference between the digital switching driving signal PWM11 and the digital switching driving signal PWM13 is set, for example, to 180° (=360°/2). The digital switching driving signal PWM11 and the digital switching driving signal PWM13 each correspond to a "first digital switching driving signal" of the present disclosure.

The MPU 20 outputs the digital switching driving signal PWM11 to the driving unit 110 of the power conversion circuit 11, and outputs the digital switching driving signal PWM13 to the driving unit 130 of the power conversion circuit 13. At that time, the MPU 20 outputs the digital switching driving signal PWM11 and the digital switching driving signal PWM13 in synchronization with each other.

The extended-control circuit 31 generates an analog switching driving signal PWM12 (its symbol is not illustrated) on the basis of the digital switching driving signal PWM11, and outputs the analog switching driving signal PWM12 to the driving unit 120 of the power conversion circuit 12. The analog switching driving signal PWM12 is a signal in which the rise and fall of the rectangular pulses have a curve shape with respect to the digital switching driving signal PWM11, which will be described below in detail.

At that time, the extended-control circuit 31 generates the analog switching driving signal PWM12 so that the on-time width of the analog switching driving signal PWM12 is equal to that of the digital switching driving signal PWM11. More specifically, the extended-control circuit 31 generates the analog switching driving signal PWM12 so that the time difference between the time, at which an on-voltage threshold THon is reached in the driving unit 120 of the power conversion circuit 12, and the time, at which an off-voltage threshold THoff is reached, is equal to the on-time width of the digital switching driving signal PWM11.

The extended-control circuit 31 sets so that the on-time of the analog switching driving signal PWM12 is delayed by a predetermined time with respect to the on-time of the digital switching driving signal PWM11. The phase difference between the digital switching driving signal PWM11 and the analog switching driving signal PWM12 is set to be shorter than the phase difference between the digital switching driving signal PWM11 and the digital switching driving signal PWM13 (the phase difference between the two digital switching driving signals). The analog switching driving signal PWM12 corresponds to a "second switching driving signal" of the present disclosure.

The extended-control circuit 32 generates an analog switching driving signal PWM14 (its symbol is not illustrated) on the basis of the digital switching driving signal PWM13, and outputs the analog switching driving signal PWM14 to the driving unit 140 of the power conversion circuit 14. The analog switching driving signal PWM14 is a signal in which the rise and fall of the rectangular pulses have a curve shape with respect to the digital switching driving signal PWM13, which will be described below in detail.

At that time, the extended-control circuit 32 generates the analog switching driving signal PWM14 so that the on-time width of the analog switching driving signal PWM14 is equal to that of the digital switching driving signal PWM13. More specifically, the extended-control circuit 32 generates the analog switching driving signal PWM14 so that the time difference between the time, at which the on-voltage threshold THon is reached in the driving unit 140 of the power conversion circuit 14, and the time, at which the off-voltage threshold THoff is reached, is equal to the on-time width of the digital switching driving signal PWM13.

The extended-control circuit 31 sets so that the on-time of the analog switching driving signal PWM12 is delayed by a predetermined time with respect to the on-time of the digital switching driving signal PWM11. The phase difference between the digital switching driving signal PWM13 and the analog switching driving signal PWM14 is set to be shorter than the phase difference between the digital switching driving signal PWM13 and the digital switching driving signal PWM11 (the phase difference between the two digital switching driving signals). The analog switching driving signal PWM14 corresponds to a "second switching driving signal" of the present disclosure.

The driving unit 110 of the power conversion circuit 11 uses the digital switching driving signal PWM11 to generate gate voltage signals to the switching device Q1H and the switching device Q1L. The gate voltage signal to the switching device Q1H is a signal which is synchronized with the digital switching driving signal PWM11 and which has a different voltage level in the Hi state. The gate voltage signal to the switching device Q1L is the inverted signal of the switching device Q1H.

The driving unit 120 of the power conversion circuit 12 uses the analog switching driving signal PWM12 to generate gate voltage signals to the switching device Q2H and the switching device Q2L. The gate voltage signal to the switching device Q2H is a rectangular-wave signal which is determined by the voltage of the analog switching driving signal PWM12, the on-voltage threshold THon, and the off-voltage threshold THoff. The gate voltage signal to the switching device Q2L is the inverted signal of the switching device Q2H.

The driving unit 130 of the power conversion circuit 13 uses the digital switching driving signal PWM13 to generate gate voltage signals to the switching device Q3H and the switching device Q3L. The gate voltage signal to the switching device Q3H is a signal which is synchronized with the digital switching driving signal PWM13 and which has a different voltage level in the Hi state. The gate voltage signal to the switching device Q3L is the inverted signal of the gate voltage signal to the switching device Q3H.

The driving unit 140 of the power conversion circuit 14 uses the analog switching driving signal PWM14 to generate gate voltage signals to the switching device Q4H and the switching device Q4L. The gate voltage signal to the switching device Q4H is a rectangular-wave signal which is determined by the voltage of the analog switching driving signal PWM14, the on-voltage threshold THon, and the off-voltage threshold THoff. The gate voltage signal to the switching device Q4L is the inverted signal of the switching device Q2H.

Through the control (process), as described above, of the MPU 20, the extended-control circuit 31, the extended-control circuit 32, and the driving units 110, 120, 130, and 140, the gate voltage signal to the switching device Q1H of the power conversion circuit 11, the gate voltage signal to the switching device Q2H of the power conversion circuit 12, the gate voltage signal to the switching device Q3H of the power conversion circuit 13, and the gate voltage signal to the switching device Q4H of the power conversion circuit 14 have the same frequency, the same on-time width, and the respective predetermined phase differences. Similarly, the gate voltage signal to the switching device Q1L of the power conversion circuit 11, the gate voltage signal to the switching device Q2L of the power conversion circuit 12, the gate voltage signal to the switching device Q3L of the power conversion circuit 13, and the gate voltage signal to the switching device Q4L of the power conversion circuit 14 have the same frequency, the same on-time width, and the respective predetermined phase differences.

Thus, the power conversion circuits 11 to 14 perform the power conversion operations in the state in which their phases are shifted to each other. Therefore, the power supply system 100 performs a power conversion operation using multiphase driving, achieving output of a desired output voltage Vout and a desired output current to the load Ro with suppression of reduction of the power conversion efficiency and with high efficiency.

Specific Description about the Extended-Control Circuits 31 and 32

Figure 2:
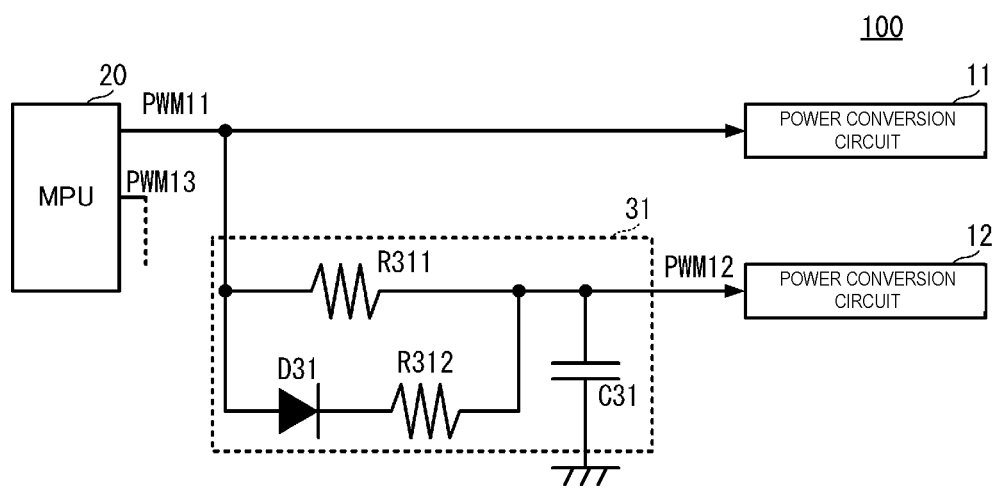
FIG. 2 is a circuit diagram illustrating an exemplary configuration of an extended-control circuit according to the first embodiment.

FIG. 2 is a circuit diagram illustrating an exemplary configuration of an extended-control circuit according to the first embodiment. FIG. 2 illustrates the extended-control circuit 31. However, the extended-control circuit 32 has the same fundamental circuit configuration.

The extended-control circuit 31 includes a resistor R311, a resistor R312, a capacitor C31, and a diode D31.

The resistor R312 and the diode D31 are connected in series to each other. More specifically, the cathode of the diode D31 is connected to a first end of the resistor R312. The series circuit of the resistor R312 and the diode D31 is connected in parallel to the resistor R311. More specifically, the series circuit of the resistor R312 and the diode D31 is connected, at its first end on the diode D31 side (the anode of the diode D31), to a first end of the resistor R311. The series circuit of the resistor R312 and the diode D31 is connected, at its second end on the resistor R312 side (a second end of the resistor R312), to a second end of the resistor R311.

The node between the first end of the resistor R311 and the anode of the diode D31 is connected to the connection line between the MPU 20 and the power conversion circuit 11 (the line through which the digital switching driving signal PWM11 is transmitted).

The node between the second end of the resistor R311 and the second end of the resistor R312 is connected to the ground reference potential through the capacitor C31. A terminal, which is opposite to the ground reference potential side, of the capacitor C31 and the node between the second end of the resistor R311 and the second end of the resistor R312 are connected to the power conversion circuit 12 (more specifically, the driving unit 120 of the power conversion circuit 12).

Through the circuit configuration described above, the extended-control circuit 31 forms a CR time constant circuit using the resistance component of the circuit, which is constituted by the resistor R311, the resistor R312, and the diode D31, and the capacitance, which is caused by the capacitor C31.

Figure 3:
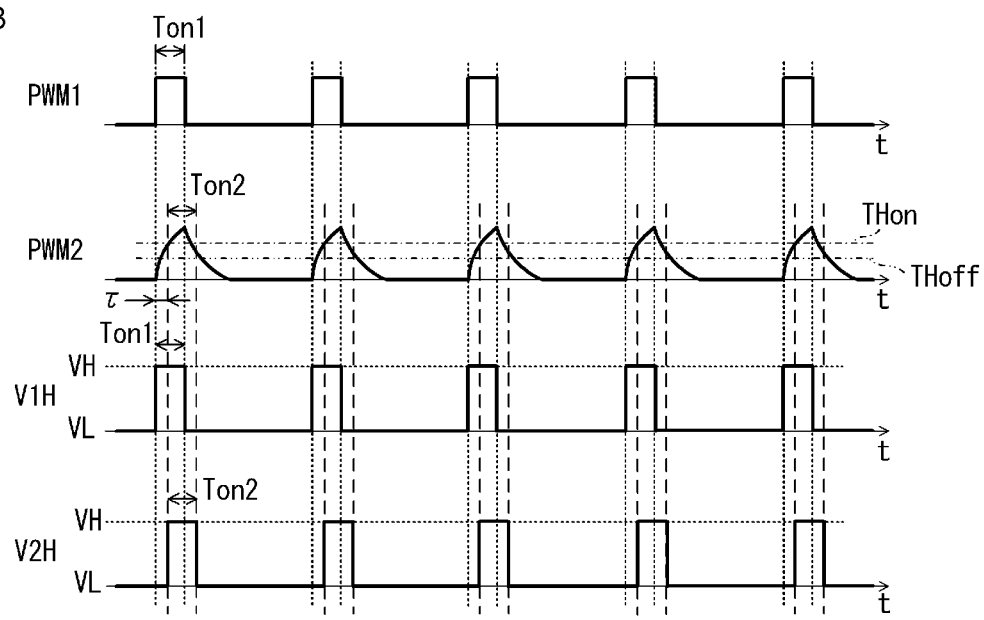
FIG. 3 is a waveform diagram illustrating an example of switching driving signals and gate voltage signals.

Thus, the digital switching driving signal PWM11 and the analog switching driving signal PWM12 have the relationship described below. FIG. 3 is a waveform diagram illustrating an example of switching driving signals and gate voltage signals. FIG. 3 illustrates the digital switching driving signal PWM11, the analog switching driving signal PWM12, a gate voltage signal V1H, and a gate voltage signal V2H in this sequence from the top.

As described above, the digital switching driving signal PWM11 is a signal which is generated by the MPU 20 and which is supplied to the power conversion circuit 11. As illustrated in FIG. 3, the digital switching driving signal PWM11 is a rectangular-wave signal having an on-time width Ton1 and a predetermined frequency. Depending on the situation, the digital switching driving signal PWM11 has some radio frequency noise superimposed thereon, which is not illustrated in FIG. 3.

The analog switching driving signal PWM12 is an output signal of the extended-control circuit 31 which receives the digital switching driving signal PWM11. The extended-control circuit 31 is a CR time constant circuit as described above.

Therefore, as illustrated in FIG. 3, the analog switching driving signal PWM12 is a signal which, in accordance with the CR time constant, rises with delay from the rise time of the digital switching driving signal PWM11, and which falls with delay from the fall time of the digital switching driving signal PWM11. The rise characteristics (waveform) and the fall characteristics (waveform) of the analog switching driving signal PWM12 are set in accordance with the resistance value of the resistor R311 of the extended-control circuit 31, the resistance value of the resistor R312, and the capacitance of the capacitor C31.

The extended-control circuit 31 sets the rise time constant of the extended-control circuit 31 so that the analog switching driving signal PWM12 reaches the on-voltage threshold THon after a delay time τ from the rise time of the digital switching driving signal PWM11. The extended-control circuit 31 sets the fall time constant which causes the on-time width Ton2 of the analog switching driving signal PWM12 to be equal to the on-time width Ton1 of the digital switching driving signal PWM11. That is, the extended-control circuit 31 functions as a "voltage-time conversion circuit" and a "threshold-signal conversion circuit" of the disclosure of the subject application.

When the voltage of the switching driving signal PWM12 rises to the on-voltage threshold THon, the driving unit 120 of the power conversion circuit 12 causes the voltage of the gate voltage signal V2H to make a transition from the Low state (VL) to the Hi state (VH) (see FIG. 3). After that, when the voltage of the analog switching driving signal PWM12 falls to the off-voltage threshold THoff, the driving unit 120 causes the voltage of the gate voltage signal V2H to make a transition from the Hi state (VH) to the Low state (VL) (see FIG. 3).

In contrast, in synchronization with the digital switching driving signal PWM11 which shifts from the Low state to the Hi state, the driving unit 110 of the power conversion circuit 11 causes the voltage of the gate voltage signal V1H to make a transition from the Low state (VL) to the Hi state (VH) (see FIG. 3). After that, in synchronization with the digital switching driving signal PWM11 which shifts from the Hi state to the Low state, the driving unit 110 causes the voltage of the gate voltage signal V1H to make a transition from the Hi state (VH) to the Low state (VL) (see FIG. 3).

The analog switching driving signal PWM12 is generated, as described above, by using the digital switching driving signal PWM11. Thus, as illustrated in FIG. 3, with respect to the gate voltage signal V1H to the switching device Q1H of the power conversion circuit 11, the gate voltage signal V2H to the switching device Q2H of the power conversion circuit 12 is a signal having the same frequency and a predetermined delay time τ, and having the on-time width Ton2 which has the same time length as that of the on-time width Ton1.

Therefore, the power conversion circuit 12 and the power conversion circuit 11 perform power conversion operations with a predetermined phase difference (time difference τ), achieving multiphase driving using the power conversion circuit 11 and the power conversion circuit 12.

Similarly, the extended-control circuit 32 causes the relationship (frequency, phase, on-time width) between the digital switching driving signal PWM13, which is supplied to the power conversion circuit 13, and the analog switching driving signal PWM14, which is supplied to the power conversion circuit 14, to be substantially the same as that between the digital switching driving signal PWM11 and the analog switching driving signal PWM12.

As described above, the digital switching driving signal PWM11 and the digital switching driving signal PWM13 have the same frequency and the same on-time width, and have the predetermined phase difference.

Thus, the power supply system 100 achieves multiphase driving using the power conversion circuits 11 to 14.

As described above, the extended-control circuits 31 and 32 are implemented by using the time constant circuits each including a resistor and a capacitor. Thus, the power supply system 100 achieves multiphase driving with a simple circuit configuration.

That is, the power supply system 100 achieves multiphase driving in accordance with the number of power conversion circuits, which are to be driven, with a simple configuration and with suppression of reduction of the power conversion efficiency.

For the resistance component determining the time constant, the extended-control circuit 31 includes the series circuit of the resistor R312 and the diode D31. Thus, the extended-control circuit 31 may be set so that the rise time constant is different from the fall time constant. Therefore, the extended-control circuit 31 achieves, more easily and with more reliability, both of setting the delay time of the analog switching driving signal PWM12 with respect to the digital switching driving signal PWM11 to a desired time and setting the same on-time width. Similarly, the extended-control circuit 32 achieves, more easily and with more reliability, both of setting the delay time of the analog switching driving signal PWM14 with respect to the digital switching driving signal PWM13 to a desired time and setting the same on-time width.

Further, since the extended-control circuit 31 is a CR circuit in which the capacitor C31 is connected to the ground reference potential, the extended-control circuit 31 also serves as a low-pass filter. Thus, even when the digital switching driving signal PWM11 has radio frequency noise superimposed thereon, the extended-control circuit 31 may suppress the harmonic wave noise. Thus, the analog switching driving signal PWM12 has a smooth waveform with suppressed radio frequency noise. Therefore, occurrence of malfunctions of the driving unit 120 may be suppressed.

Similarly, even when the digital switching driving signal PWM13 has radio frequency noise superimposed thereon, the extended-control circuit 32 may suppress the harmonic wave noise. Thus, the analog switching driving signal PWM14 has a smooth waveform with suppressed radio frequency noise. Therefore, occurrence of malfunctions of the driving unit 140 may be suppressed.

Thus, the power supply system 100 achieves multiphase driving with a simple configuration and with high operational reliability due to suppressed occurrence of malfunctions.

Application Example of the Configuration of the Power Supply System 100

Figure 4B:
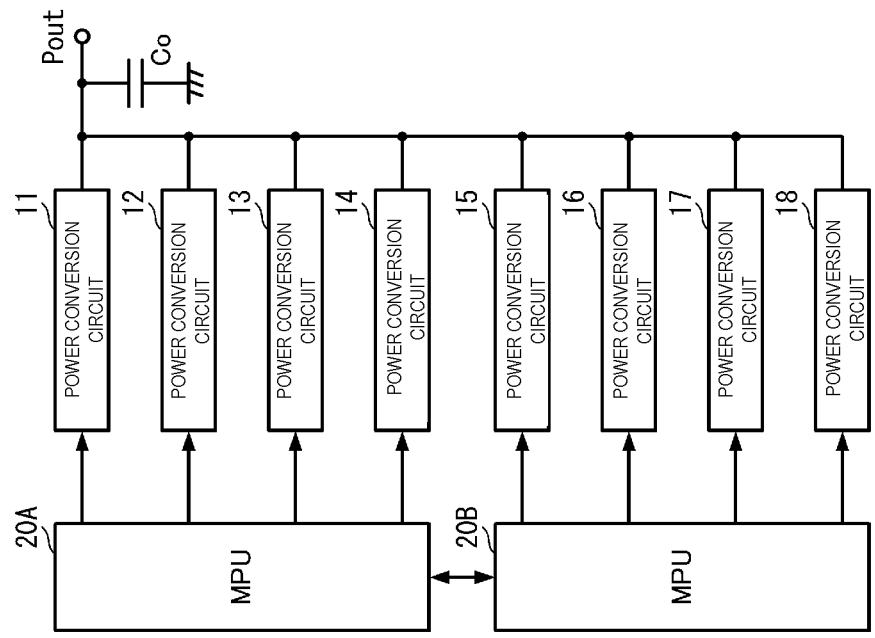
FIGS. 4A and 4B are functional block diagrams for illustrating exemplary effectiveness of a power supply system according to the first embodiment of the present disclosure.
Figure 4A:
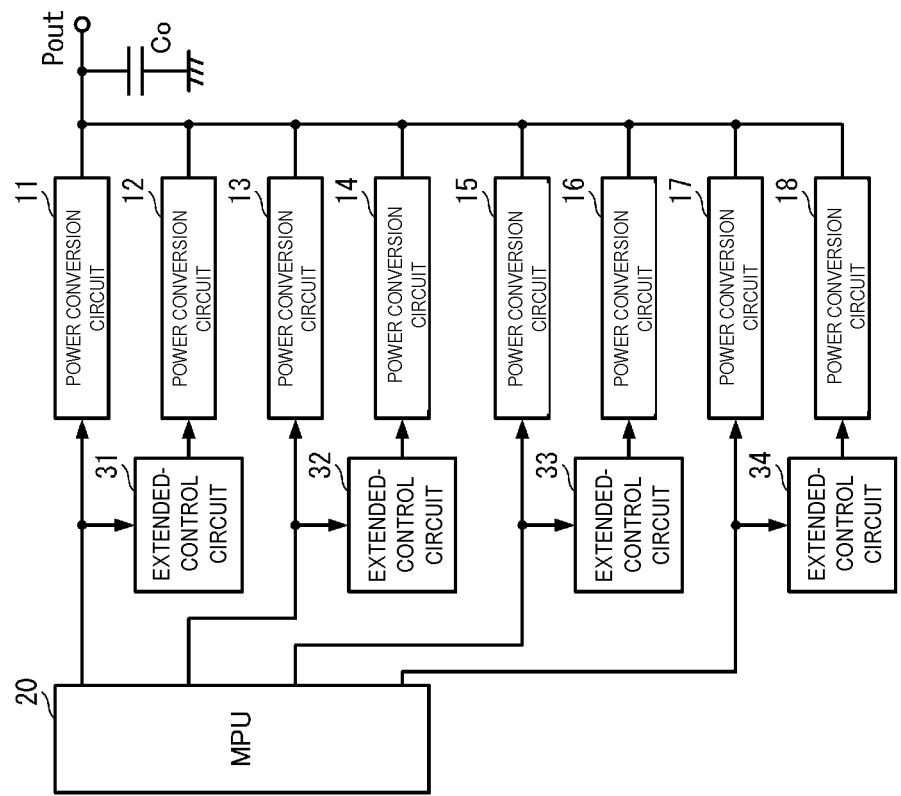

FIGS. 4A and 4B are functional block diagrams for illustrating exemplary effectiveness of a power supply system according to the first embodiment of the present disclosure. FIG. 4A is a diagram illustrating an aspect for addressing an increase of the number of phases in the case of use of the configuration of the disclosure of the subject application. FIG. 4B is a diagram illustrating an aspect for addressing an increase of the number of phases in the case of use of a configuration of the related art. FIGS. 4A and 4B illustrate the case of use of a four-phase output MPU.

In the configuration of the related art, as illustrated in FIG. 4B, in the case where eight power conversion circuits 11 to 18 are used to implement multiphase driving, a four-phase output MPU 20A supplies switching driving signals to the four power conversion circuits 11 to 14, and a four-phase output MPU 20B supplies switching driving signals to the four power conversion circuits 15 to 18. The MPU 20A and the MPU 20B receive/transmit a synchronization control signal or the like, and perform a synchronization process. Thus, eight-phase driving is implemented.

In contrast, as illustrated in FIG. 4A, in the disclosure of the subject application, multiple extended-control circuits 31 to 34 are used so that the four-phase output MPU 20 supplies switching driving signals to the eight power conversion circuits 11 to 18, achieving eight-phase driving.

Thus, use of the configuration of the present disclosure enables power conversion circuits, whose number is more than the number of phases which may be output by a single MPU 20, to be driven in a multiphase manner. That is, in accordance with a desired number of power conversion circuits, the scale of the power supply system may be extended without an increase of the number of MPUs. More specifically, the power supply system of the disclosure enables the scale of the output power capacitance to be extended in the following manners: with a simple configuration in which a control IC is connected to extension circuits; with small power consumption in the extension circuits and suppression of reduction of the power conversion efficiency; by flexibly responding to an increase of current without being limited by the number of driving outputs of the control IC and in accordance with the number of power conversion circuits which are to be driven.

At that time, the extended-control circuits are implemented by using CR circuits having a simple circuit configuration constituted by a resistor, a diode, and a capacitor. Thus, the circuit configuration is not complicated. The number of phases of multiphase driving may be increased with a relatively simple configuration, enabling the scale of the power supply system to be extended.

Second Embodiment

Figure 5:
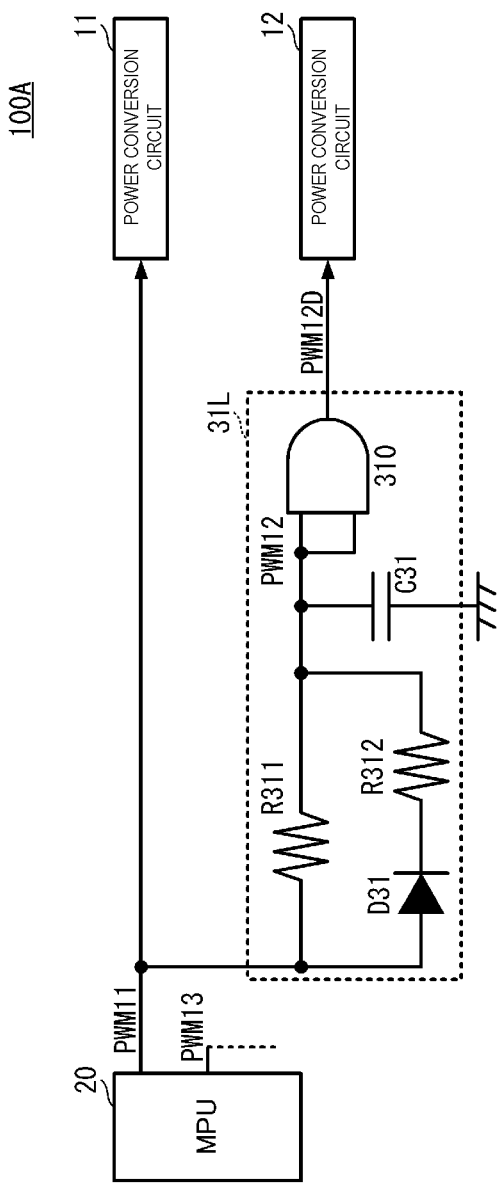
FIG. 5 is a circuit block diagram illustrating a part of an extended-control circuit of a power supply system according to a second embodiment.

A power supply system according to a second embodiment of the present disclosure will be described by referring to figures. FIG. 5 is a circuit block diagram illustrating a part of an extended-control circuit of a power supply system according to the second embodiment.

As illustrated in FIG. 5, a power supply system 100A according to the second embodiment is different from the power supply system 100 according to the first embodiment in the configuration of extended-control circuits. The other configuration of the power supply system 100A is substantially the same as that of the power supply system 100, and substantially the same points will not be described.

The power supply system 100A includes an extended-control circuit 31L. The power supply system 100A includes, instead of the extended-control circuit 32 of the power supply system 100, an extended-control circuit 32L (not illustrated) having substantially the same configuration as that of the extended-control circuit 31L.

The extended-control circuit 31L is different from the extended-control circuit 31 according to the first embodiment in that a logic circuit 310 is added. The other configuration of the extended-control circuit 31L is substantially the same as that of the extended-control circuit 31.

The extended-control circuit 31L includes the resistor R311, the resistor R312, the capacitor C31, the diode D31, and the logic circuit 310.

The resistor R312 and the diode D31 are connected in series to each other. The series circuit of the resistor R312 and the diode D31 is connected in parallel to the resistor R311.

The node between the first end of the resistor R311 and the anode of the diode D31 is connected to the connection line between the MPU 20 and the power conversion circuit 11 (the line through which the digital switching driving signal PWM11 is transmitted).

The node between the second end of the resistor R311 and the second end of the resistor R312 is connected to the ground reference potential through the capacitor C31.

The terminal, which is opposite to the ground reference potential side, of the capacitor C31 and the node between the second end of the resistor R311 and the second end of the resistor R312 are connected to the input terminal of the logic circuit 310.

The output terminal of the logic circuit 310 is connected to the power conversion circuit 12 (more specifically, the driving unit 120 of the power conversion circuit 12).

As described above, the resistor R311, the resistor R312, the capacitor C31, and the diode D31 form a CR circuit. Thus, the analog switching driving signal PWM12 is output from the CR circuit.

The logic circuit 310 is formed, for example, by using an AND circuit and a comparator. The logic circuit 310, which receives the analog switching driving signal PWM12, performs a binarization process using the on-voltage threshold THon and the off-voltage threshold THoff. Thus, the logic circuit 310 generates a digital switching driving signal PWM12D which is a rectangular-wave signal. The logic circuit 310 outputs the digital switching driving signal PWM12D to the driving unit 120 of the power conversion circuit 12.

Figure 6:
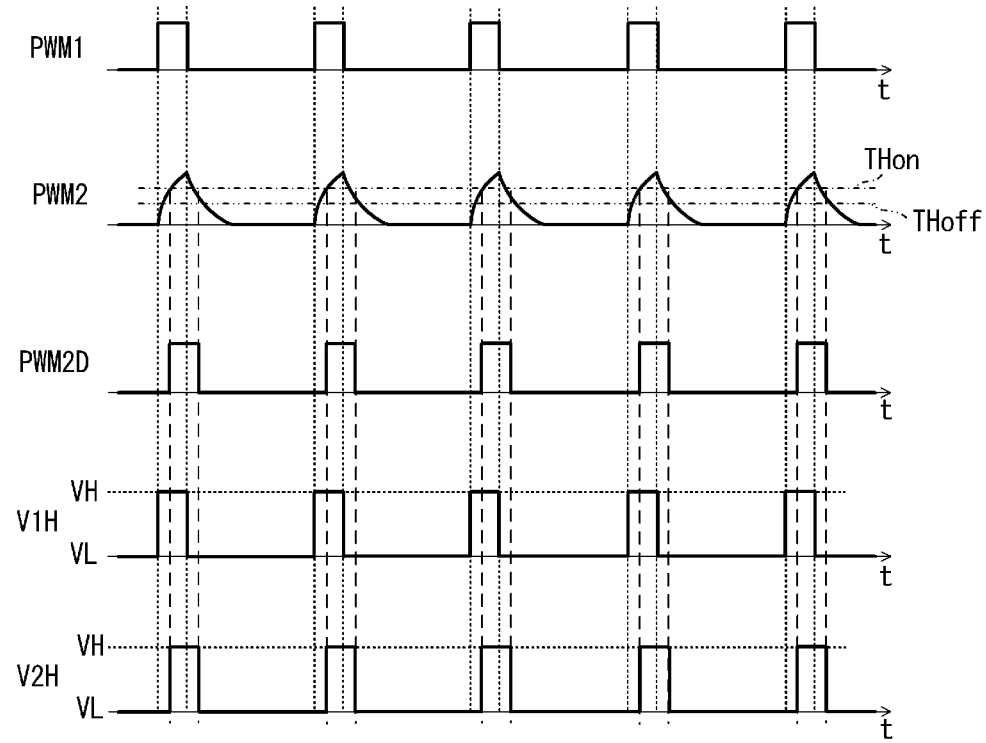
FIG. 6 is a waveform diagram illustrating an example of switching driving signals and gate voltage signals.

FIG. 6 is a waveform diagram illustrating an example of switching driving signals and gate voltage signals. FIG. 6 illustrates the digital switching driving signal PWM11, the analog switching driving signal PWM12, the digital switching driving signal PWM12D, the gate voltage signal V1H, and the gate voltage signal V2H in this sequence from the top.

Due to the extended-control circuit 31L, as illustrated in FIG. 6, the digital switching driving signal PWM12D, which is supplied to the power conversion circuit 12, is a signal having the same frequency as that of the digital switching driving signal PWM11, which is supplied to the power conversion circuit 11, and having the same on-time width, but having a phase difference.

Thus, like the power supply system 100, the power supply system 100A achieves multiphase driving in accordance with the number of power conversion circuits, which are to be driven, with a simple configuration and with suppression of reduction of the power conversion efficiency.

In the power supply system 100A, the power conversion circuits 11 to 14 are supplied with rectangular-wave signals having the same waveform shape just with phase differences. Thus, occurrence of malfunctions of the power conversion circuits 11 to 14 may be further suppressed.

Third Embodiment

Figure 7:
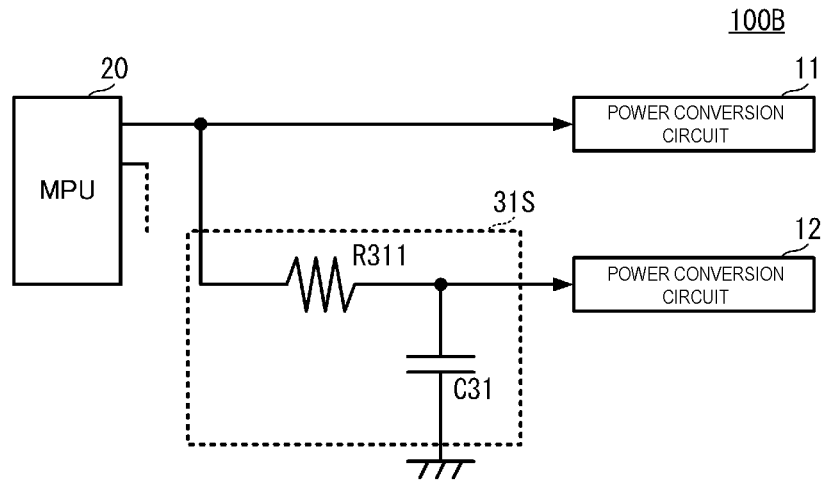
FIG. 7 is a circuit block diagram illustrating a part of an extended-control circuit of a power supply system according to a third embodiment.
Figure 8:
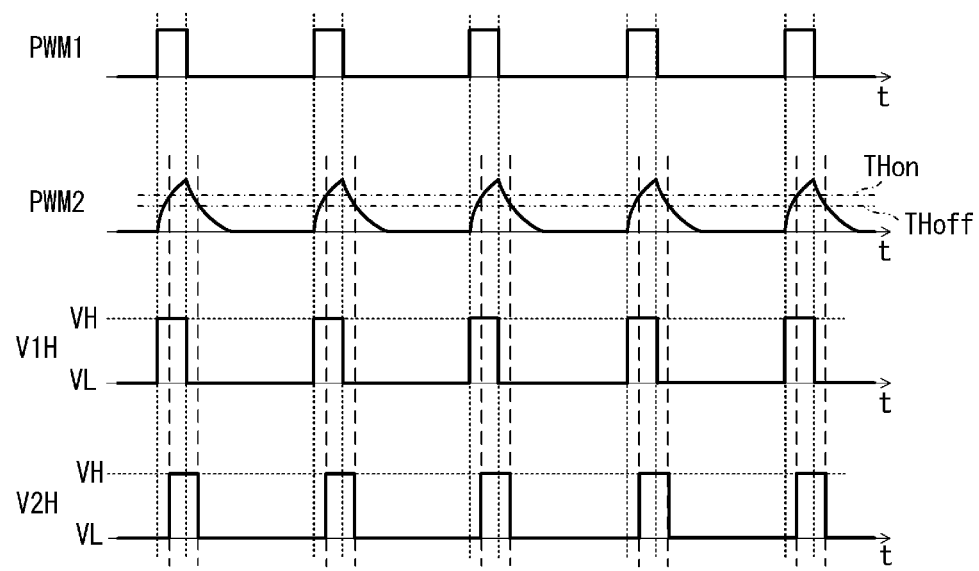
FIG. 8 is a waveform diagram illustrating an example of switching driving signals and gate voltage signals.

A power supply system according to a third embodiment of the present disclosure will be described by referring to figures. FIG. 7 is a circuit block diagram illustrating a part of an extended-control circuit of a power supply system according to the third embodiment. FIG. 8 is a waveform diagram illustrating an example of switching driving signals and gate voltage signals. FIG. 8 illustrates the digital switching driving signal PWM11, the analog switching driving signal PWM12, the gate voltage signal V1H, and the gate voltage signal V2H in this sequence from the top.

As illustrated in FIG. 7, a power supply system 100B according to the third embodiment is different from the power supply system 100 according to the first embodiment in the configuration of extended-control circuits. The other configuration of the power supply system 100B is substantially the same as that of the power supply system 100, and substantially the same points will not be described.

The power supply system 100B includes an extended-control circuit 31S. The power supply system 100B includes, instead of the extended-control circuit 32 of the power supply system 100, an extended-control circuit 32S (not illustrated) having substantially the same configuration as that of the extended-control circuit 31S.

The extended-control circuit 31S is different from the extended-control circuit 31 according to the first embodiment in that the resistor R312 and the diode D31 are removed from the extended-control circuit 31. The other configuration of the extended-control circuit 31S is substantially the same as that of the extended-control circuit 31.

In this configuration, as illustrated in FIG. 8, appropriate setting of the resistance value of the resistor R311 and the capacitance of the capacitor C31 also enables the phase difference between the gate voltage signal V1H to the switching device Q1H of the power conversion circuit 11 and the gate voltage signal V2H to the switching device Q2H of the power conversion circuit 12 to be set to a predetermined value (not equal to zero).

Thus, like the power supply system 100, the power supply system 100B achieves multiphase driving in accordance with the number of power conversion circuits, which are to be driven, with a simple configuration and with suppression of reduction of the power conversion efficiency.

The power supply system 100B achieves a circuit configuration simpler than that of the power supply system 100.

Fourth Embodiment

Figure 9:
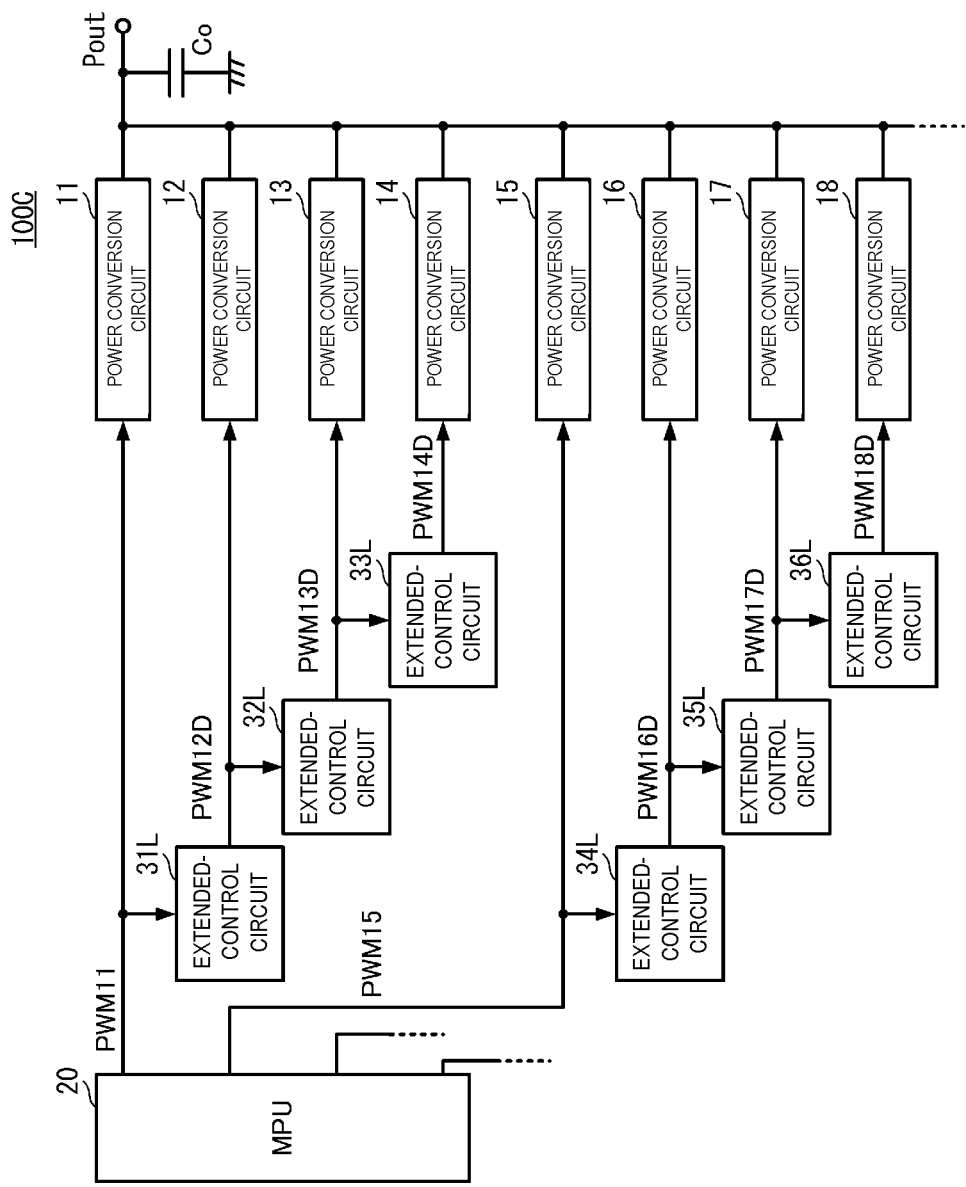
FIG. 9 is a circuit block diagram illustrating an exemplary power supply system according to a fourth embodiment.
Figure 10:
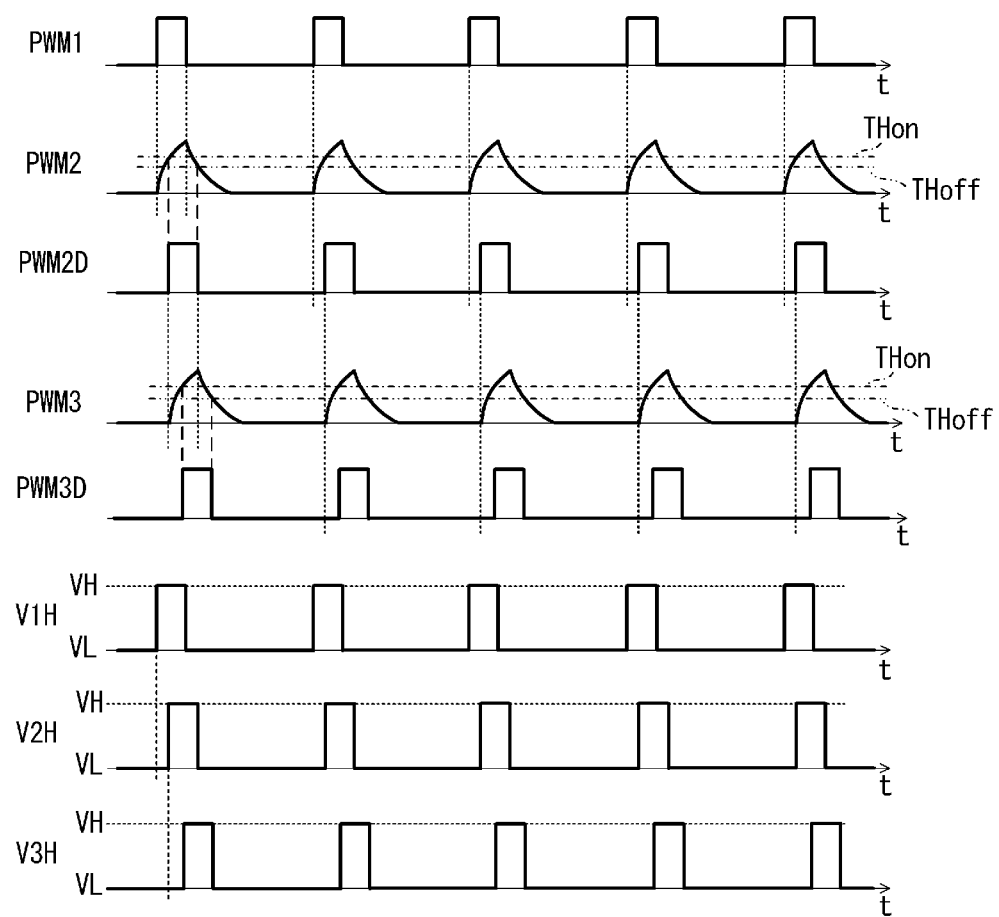
FIG. 10 is a waveform diagram illustrating an example of switching driving signals and gate voltage signals.

A power supply system according to a fourth embodiment of the present disclosure will be described by referring to figures. FIG. 9 is a circuit block diagram illustrating an exemplary power supply system according to the fourth embodiment. FIG. 10 is a waveform diagram illustrating an example of switching driving signals and gate voltage signals. FIG. 10 illustrates the digital switching driving signal PWM11, the analog switching driving signal PWM12, the digital switching driving signal PWM12D, the analog switching driving signal PWM13, a digital switching driving signal PWM13D, the gate voltage signal V1H, the gate voltage signal V2H, and a gate voltage signal V3H in this sequence from the top.

As illustrated in FIG. 9, a power supply system 100C according to the fourth embodiment is different from the power supply system 100A according to the second embodiment in that extended-control circuits are cascade-connected. The other fundamental configuration of the power supply system 100C is substantially the same as that of the power supply system 100A, and substantially the same points will not be described.

In the example in FIG. 9, the power supply system 100C is a system in which more than eight power conversion circuits are driven in a multiphase manner.

The power supply system 100C includes the power conversion circuits 11 to 18 and multiple extended-control circuits 31L to 36L.

The power conversion circuits 11 to 18 have the same circuit configuration. The extended-control circuits 31L to 36L have the same circuit configuration. The extended-control circuits 31L to 36L include the same circuit configuration as that of the extended-control circuit 31L described in the second embodiment.

The MPU 20 is connected to the power conversion circuit 11 and the power conversion circuit 15 through the respective individual connection lines.

The extended-control circuit 31L is connected, at its input end, to the connection line between the MPU 20 and the power conversion circuit 11. The extended-control circuit 31L is connected, at its output end, to the power conversion circuit 12.

The extended-control circuit 32L is connected, at its input end, to the output end of the extended-control circuit 31L. The extended-control circuit 32L is connected, at its output end, to the power conversion circuit 13.

The extended-control circuit 33L is connected, at its input end, to the output end of the extended-control circuit 32L. The extended-control circuit 33L is connected, at its output end, to the power conversion circuit 14.

The extended-control circuit 34L is connected, at its input end, to the connection line between the MPU 20 and the power conversion circuit 15. The extended-control circuit 34L is connected, at its output end, to the power conversion circuit 16.

The extended-control circuit 35L is connected, at its input end, to the output end of the extended-control circuit 34L. The extended-control circuit 35L is connected, at its output end, to the power conversion circuit 17.

The extended-control circuit 36L is connected, at its input end, to the output end of the extended-control circuit 35L. The extended-control circuit 36L is connected, at its output end, to the power conversion circuit 18.

The MPU 20 outputs (supplies) the digital switching driving signal PWM11 to the power conversion circuit 11. The MPU 20 outputs (supplies) a digital switching driving signal PWM15 to the power conversion circuit 15. The digital switching driving signal PWM15 is a signal having a predetermined phase difference with respect to the digital switching driving signal PWM11.

The phase difference is determined as follows: the number of multiphase-driven power conversion circuits (the number of devices) in the power supply system 100C is referred to; and the phase difference is determined by the number of power conversion circuits (the number of devices) to which the MPU 20 directly outputs digital switching driving signals. For example, in the case of 36 multiphase-driven power conversion circuits, when the MPU 20 directly outputs digital switching driving signals to four power conversion circuits, the phase difference is set to 90°.

As illustrated in FIG. 9, the extended-control circuit 31L, which receives the digital switching driving signal PWM11, generates the analog switching driving signal PWM12, and generates the digital switching driving signal PWM12D from the analog switching driving signal PWM12. The extended-control circuit 31L outputs the digital switching driving signal PWM12D to the power conversion circuit 12.

As illustrated in FIG. 9, the extended-control circuit 32L, which receives the digital switching driving signal PWM12D, generates the analog switching driving signal PWM13, and generates the digital switching driving signal PWM13D from the analog switching driving signal PWM13. The extended-control circuit 32L outputs the digital switching driving signal PWM13D to the power conversion circuit 13.

Like the extended-control circuits 31L and 32L, the extended-control circuit 33L, which receives the digital switching driving signal PWM13D, generates a digital switching driving signal PWM14D. The extended-control circuit 33L outputs the digital switching driving signal PWM14D to the power conversion circuit 14.

This process causes the digital switching driving signal PWM12D to be a signal delayed by a predetermined phase difference with respect to the digital switching driving signal PWM11, causes the digital switching driving signal PWM13D to be a signal delayed by a predetermined phase difference with respect to the digital switching driving signal PWM12D, and causes the digital switching driving signal PWM14D to be a signal delayed by a predetermined phase difference with respect to the digital switching driving signal PWM13D.

Thus, the power supply system 100C may use the single digital switching driving signal PWM11 to generate the digital switching driving signals PWM12D, PWM13D, and PWM14D, which are delayed sequentially, and may supply the signals to the respective power conversion circuits 11 to 14.

Similarly, the extended-control circuit 34L, which receives the digital switching driving signal PWM15, generates a digital switching driving signal PWM16D for output to the power conversion circuit 16. The extended-control circuit 35L, which receives the digital switching driving signal PWM16D, generates a digital switching driving signal PWM17D for output to the power conversion circuit 17. The extended-control circuit 36L, which receives the digital switching driving signal PWM17D, generates a digital switching driving signal PWM18D for output to the power conversion circuit 18.

Thus, the power supply system 100C may use the single digital switching driving signal PWM15 to generate the digital switching driving signals PWM16D, PWM17D, and PWM18D, which are delayed sequentially, and may supply the signals to the respective power conversion circuits 15 to 18.

As described above, the configuration of the power supply system 100C enables four or more power conversion circuits to be driven in a multiphase manner by using a single digital switching driving signal which is output from the MPU 20. Thus, even in a configuration in which more power conversion circuits are required, the power supply system 100C achieves multiphase driving without an unnecessary increase of the number of MPUs 20.

Since the extended-control circuits 31L to 36L use CR circuits, the power supply system 100C may constitute a scale-extendable power supply system with a simple circuit configuration.

In the configuration described above, for example, in the case of 20 multiphase-driven power conversion circuits, when the MPU 20 directly outputs digital switching driving signals to four power conversion circuits (for example, in FIG. 9, when a power conversion circuit 191 and a power conversion circuit 192, which are not illustrated, are directly supplied with digital switching driving signals), the phase difference between the digital switching driving signal PWM11 and the digital switching driving signal PWM15 is set, for example, to 360°/20×4 (the number of power conversion circuits driven by using a single digital switching driving signal PWM11 or PWM15 as a source signal)=72. The phase difference between the digital switching driving signal PWM15 and a digital switching driving signal PWM19 (a driving signal to the power conversion circuit 191 which is not illustrated) is also set, for example, to 72°. The phase difference between the digital switching driving signal PWM19 (the driving signal to the power conversion circuit 191 which is not illustrated) and a digital switching driving signal PWM20 (a driving signal to the power conversion circuit 192 which is not illustrated) is set, for example, to 18°. Further, the phase difference between the digital switching driving signal PWM20 (the driving signal to the power conversion circuit 192 which is not illustrated) and the digital switching driving signal PWM11 is set, for example, to 18°. Thus, in the case of use of 20 power conversion circuits, the power supply balance may be improved, and reduction of the power conversion efficiency may be further suppressed.

Fifth Embodiment

Figure 11:
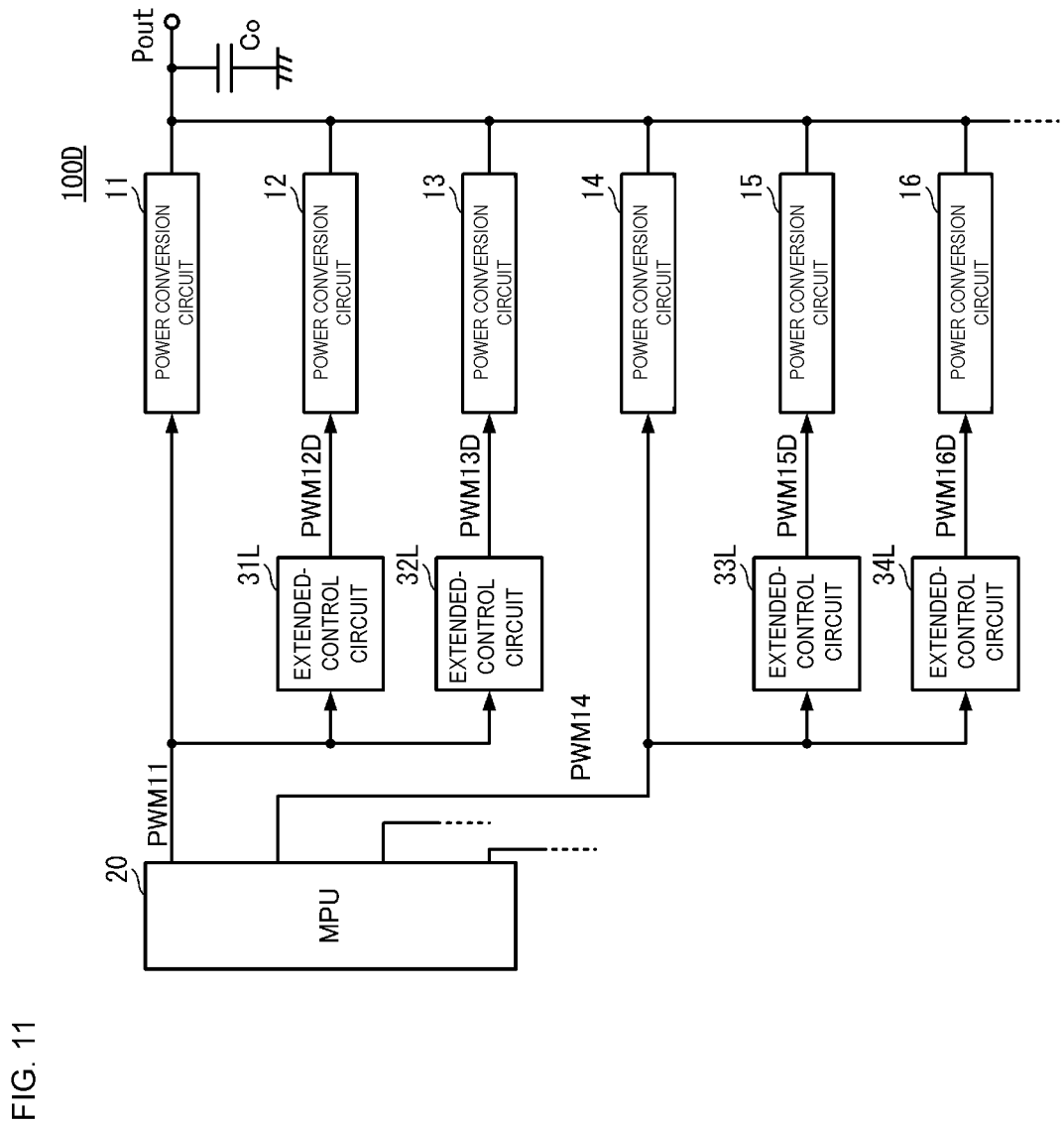
FIG. 11 is a circuit block diagram illustrating an exemplary power supply system according to a fifth embodiment.
Figure 12:
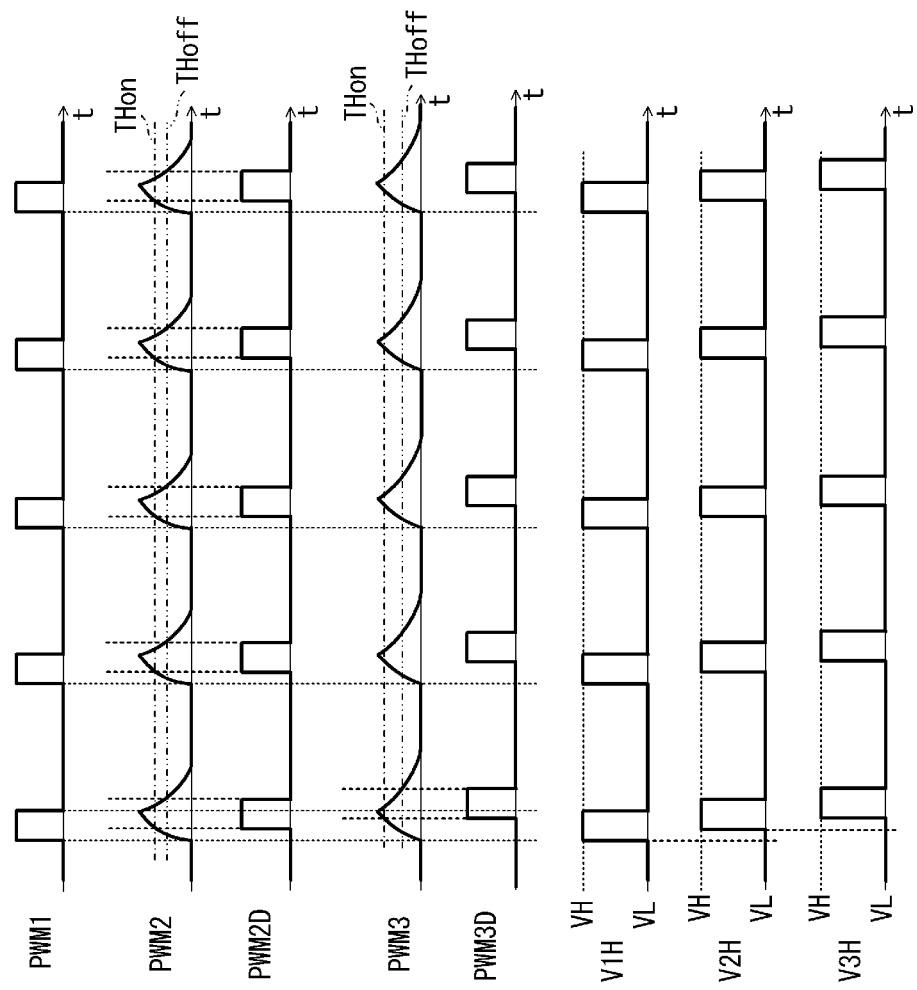
FIG. 12 is a waveform diagram illustrating an example of switching driving signals and gate voltage signals.

A power supply system according to a fifth embodiment of the present disclosure will be described by referring to figures. FIG. 11 is a circuit block diagram illustrating an exemplary power supply system according to the fifth embodiment. FIG. 12 is a waveform diagram illustrating an example of switching driving signals and gate voltage signals. FIG. 12 illustrates the digital switching driving signal PWM11, the analog switching driving signal PWM12, the digital switching driving signal PWM12D, the analog switching driving signal PWM13, the digital switching driving signal PWM13D, the gate voltage signal V1H, the gate voltage signal V2H, and the gate voltage signal V3H in this sequence from the top.

As illustrated in FIG. 11, a power supply system 100D according to the fifth embodiment is different from the power supply system 100A according to the second embodiment in that multiple extended-control circuits are connected in parallel. The other fundamental configuration of the power supply system 100D is substantially the same as that of the power supply system 100A, and substantially the same points will not be described.

In the example in FIG. 11, the power supply system 100D is a system in which more than six power conversion circuits are driven in a multiphase manner.

The power supply system 100D includes the power conversion circuits 11 to 16 and the extended-control circuits 31L to 34L.

The power conversion circuits 11 to 16 have the same circuit configuration. The extended-control circuits 31L to 34L have the same circuit configuration. The extended-control circuits 31L to 34L have the same circuit configuration as that of the extended-control circuit 31L in the second embodiment, but have corresponding different CR time constant settings.

The MPU 20 is connected to the power conversion circuit 11 and the power conversion circuit 14 through the respective individual connection lines.

The extended-control circuit 31L is connected, at its input end, to the connection line between the MPU 20 and the power conversion circuit 11. The extended-control circuit 31L is connected, at its output end, to the power conversion circuit 12.

The extended-control circuit 32L is connected, at its input end, to the connection line between the MPU 20 and the power conversion circuit 11. The extended-control circuit 32L is connected, at its output end, to the power conversion circuit 13.

The extended-control circuit 33L is connected, at its input end, to the connection line between the MPU 20 and the power conversion circuit 14. The extended-control circuit 33L is connected, at its output end, to the power conversion circuit 15.

The extended-control circuit 34L is connected, at its input end, to the connection line between the MPU 20 and the power conversion circuit 14. The extended-control circuit 34L is connected, at its output end, to the power conversion circuit 16.

The MPU 20 outputs (supplies) the digital switching driving signal PWM11 to the power conversion circuit 11. The MPU 20 outputs (supplies) a digital switching driving signal PWM14 to the power conversion circuit 14. The digital switching driving signal PWM14 is a signal having a predetermined phase difference with respect to the digital switching driving signal PWM11. The phase difference is set in substantially the same principle as that in the fourth embodiment, which will not be described.

As illustrated in FIG. 11, the extended-control circuit 31L, which receives the digital switching driving signal PWM11, generates the analog switching driving signal PWM12, and generates the digital switching driving signal PWM12D from the analog switching driving signal PWM12. The extended-control circuit 31L outputs the digital switching driving signal PWM12D to the power conversion circuit 12.

As illustrated in FIG. 11, the extended-control circuit 32L, which receives the digital switching driving signal PWM11, generates the analog switching driving signal PWM13, and generates the digital switching driving signal PWM13D from the analog switching driving signal PWM13. The extended-control circuit 32L outputs the digital switching driving signal PWM13D to the power conversion circuit 13.

At that time, as illustrated in FIG. 12, the analog switching driving signal PWM13 has a waveform different from that of the analog switching driving signal PWM12. More specifically, the analog switching driving signal PWM13 reaches the on-voltage threshold THon later than the analog switching driving signal PWM12. The analog switching driving signal PWM13 reaches the off-voltage threshold THoff later than the analog switching driving signal PWM12.

The time difference between the time, at which the analog switching driving signal PWM13 reaches the on-voltage threshold THon, and the time, at which the analog switching driving signal PWM13 reaches the off-voltage threshold THoff, is set to be equal to the time difference between the time, at which the analog switching driving signal PWM12 reaches the on-voltage threshold THon, and the time, at which the analog switching driving signal PWM12 reaches the off-voltage threshold THoff.

This is implemented by making the CR time constant of the extended-control circuit 32L different from that of the extended-control circuit 31L.

This process causes the digital switching driving signal PWM12D to be a signal delayed by a predetermined phase difference with respect to the digital switching driving signal PWM11, and causes the digital switching driving signal PWM13D to be a signal delayed by a predetermined phase difference with respect to the digital switching driving signal PWM12D.

Thus, the power supply system 100D may use the single digital switching driving signal PWM11 to generate the digital switching driving signals PWM12D and PWM13D, which are delayed sequentially, and may supply the signals to the respective power conversion circuits 11 to 13.

Similarly, the extended-control circuit 33L, which receives the digital switching driving signal PWM14, generates a digital switching driving signal PWM15D for output to the power conversion circuit 15. The extended-control circuit 34L, which receives the digital switching driving signal PWM15D, generates the digital switching driving signal PWM16D for output to the power conversion circuit 16.

Thus, the power supply system 100D may use the single digital switching driving signal PWM14 to generate the digital switching driving signals PWM15D and PWM16D, which are delayed sequentially, and may supply the signals to the respective power conversion circuits 14 to 16.

As described above, the configuration of the power supply system 100D enables three or more power conversion circuits to be driven in a multiphase manner by using a single digital switching driving signal which is output from the MPU 20. Thus, even in a configuration in which more power conversion circuits are required, the power supply system 100D achieves multiphase driving without an unnecessary increase of the number of MPUs 20.

Since the extended-control circuits 31L to 34L use CR circuits, the power supply system 100D may constitute a scale-extended power supply system with a simple circuit configuration.

The power supply system 100D may employ, instead of the extended-control circuits 31L to 34L, substantially the same configuration as that of the extended-control circuit 31 in the first embodiment. In other words, the power supply system 100D may use a configuration without the logic circuit 310. This enables the power supply system 100D to achieve a further simpler circuit configuration.

In the embodiments described above, the aspect in which the on-time width of a digital switching driving signal, which is output by the MPU 20, is equal to that of a switching driving signal, which is output by an extended-control circuit, is described. However, for example, this value is set depending on the number of multiphase-driven power conversion circuits. For example, in the power supply system 100 according to the first embodiment, the MPU 20 is capable of adjusting the on-time width on the basis of the feedback voltage of the output voltage Vout and the feedback currents from the power conversion circuits 11 to 14. At that time, the current balance among the power conversion circuits 11 to 14 is capable of being adjusted if the following values are appropriately set on the basis of the feedback currents from the power conversion circuits 11 to 14: the on-time width of the digital switching driving signals which are output from the MPU 20; the on-voltage threshold THon and the off-voltage threshold THoff which are set to the extended-control circuits 31 and 32; the time, at which the on-voltage threshold THon is reached, and the time, at which the off-voltage threshold THoff is reached.

The MPU 20 may include an input terminal for a PMBus signal. In accordance with the voltage or current specified by the PMBus signal, the MPU 20 may determine the number of multiphase-driven power conversion circuits, and may set the on-time width.

The configurations according to the embodiments described above may be combined with each other appropriately. Effects corresponding to the respective combinations may be produced.

What is claimed is:
1. A scalable power supply system comprising:
a plurality of power conversion circuits that each include an inductor and a power semiconductor circuit, the power semiconductor circuit including a switching device and a driving unit, the switching device being configured to control current flowing through the inductor, the driving unit driving the switching device;
a power management control circuit configured to generate a first digital switching driving signal that is to be provided to a first power semiconductor circuit of the plurality of power semiconductor circuits;
an extended-control circuit that is electrically connected between the power management control circuit and a second power semiconductor circuit of the plurality of power semiconductor circuits, and that is configured to generate a second switching driving signal from the first digital switching driving signal to provide the second switching driving signal to the second power semiconductor circuit, the second power semiconductor circuit being different from the first power semiconductor circuit,
wherein
the extended-control circuit has a voltage-time conversion circuit that is configured to set a predetermined signal delay time with respect to the first digital switching driving signal and that is configured to generate the second switching driving signal, the voltage-time conversion circuit has a threshold-signal conversion circuit that is configured to use a time constant of a CR circuit and a threshold voltage to determine the signal delay time, the CR circuit including a resistance and a capacitor, the extended-control circuit is configured to
- use the time constant of the CR circuit of the threshold-signal conversion circuit to set a phase of a second analog switching driving signal on which the second switching driving signal is based,
- use the threshold voltage of the threshold-signal conversion circuit and the second analog switching driving signal to set an on-time width of the second switching driving signal, the second analog switching driving signal having the phase which has been set, the on-time width being set to be equal to an on-time width of the first digital switching driving signal, and
- determine a count of the plurality of power conversion circuits in accordance with a total number of signals which is obtained by adding a first signal count of the first digital switching driving signal and a second signal count of the second switching driving signal together, and the threshold-signal conversion circuit further includes a logic circuit configured to set the phase and the on-time width of the second switching driving signal, and that outputs the second switching driving signal as a digital switching driving signal; and a resistance setting circuit configured to set the resistance of the CR circuit, wherein the resistance setting circuit includes a first resistance device, a second resistance device, and a rectifier device, and a series circuit of the second resistance device and the rectifier device is connected in parallel to the first resistance device, and wherein the power management control circuit generates a plurality of the first digital switching drive signal having different phases based on the number of the plurality of power conversion circuits, and synchronizes the plurality of first digital switching drive signals and outputs them to different extended control circuits.

2. The scalable power supply system according to claim 1, wherein
the extended-control circuit comprises a plurality of extended-control circuits that are cascade-connected.

3. The scalable power supply system according to claim 2, wherein
the power management control circuit comprises a multiphase controller.

4. The scalable power supply system according to claim 2, wherein
the power management control circuit is configured to receive a PMBus signal, and is configured to exert control in accordance with the PMBus signal.

5. The scalable power supply system according to claim 1, wherein
the extended-control circuit comprises a plurality of extended-control circuits that are connected in parallel.

6. The scalable power supply system according to claim 5, wherein
the power management control circuit comprises a multiphase controller.

7. The scalable power supply system according to claim 5, wherein
the power management control circuit is configured to receive a PMBus signal, and is configured to exert control in accordance with the PMBus signal.

8. The scalable power supply system according to claim 1, wherein
the power management control circuit comprises a multiphase controller.

9. The scalable power supply system according to claim 1, wherein
the power management control circuit is configured to receive a PMBus signal, and is configured to exert control in accordance with the PMBus signal.

* * * * *